June 9, 1959
J. P. GLASBY, JR., ET AL
2,889,846
APPARATUS FOR MOVING FLUID MATERIAL BY
SUCTION AND COLLECTING THE SAME
Filed March 26, 1957
2 Sheets-Sheet 1
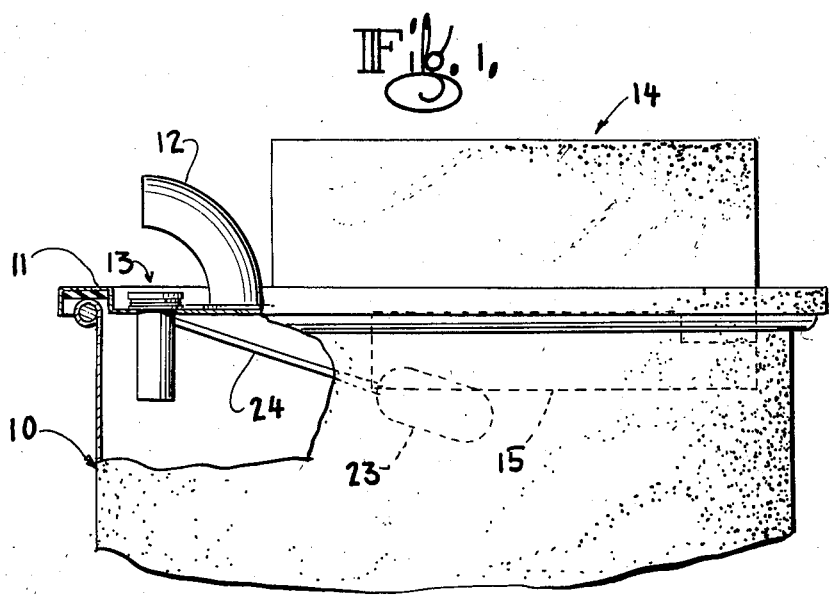
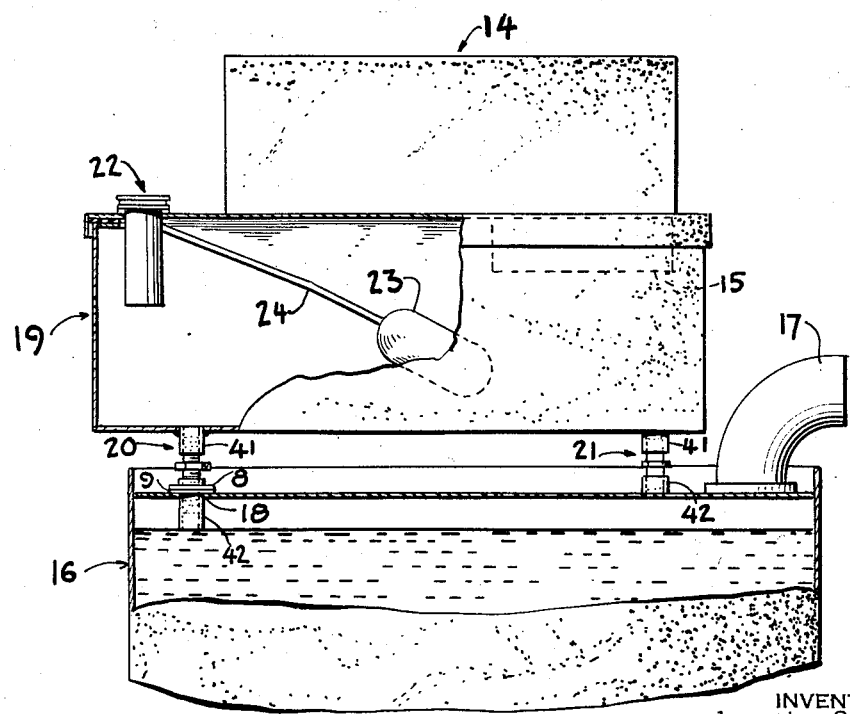
INVENTORS
Jonathan P. Glasby, jr.
Lubin Palmer, Jr.
BY Frank P. Pendleton
ATTORNEY June 9, 1959 J. P. GLASBY, JR., ET AL 2,889,846
APPARATUS FOR MOVING FLUID MATERIAL BY
SUCTION AND COLLECTING THE SAME
Filed March 26, 1957 2 Sheets-Sheet 2
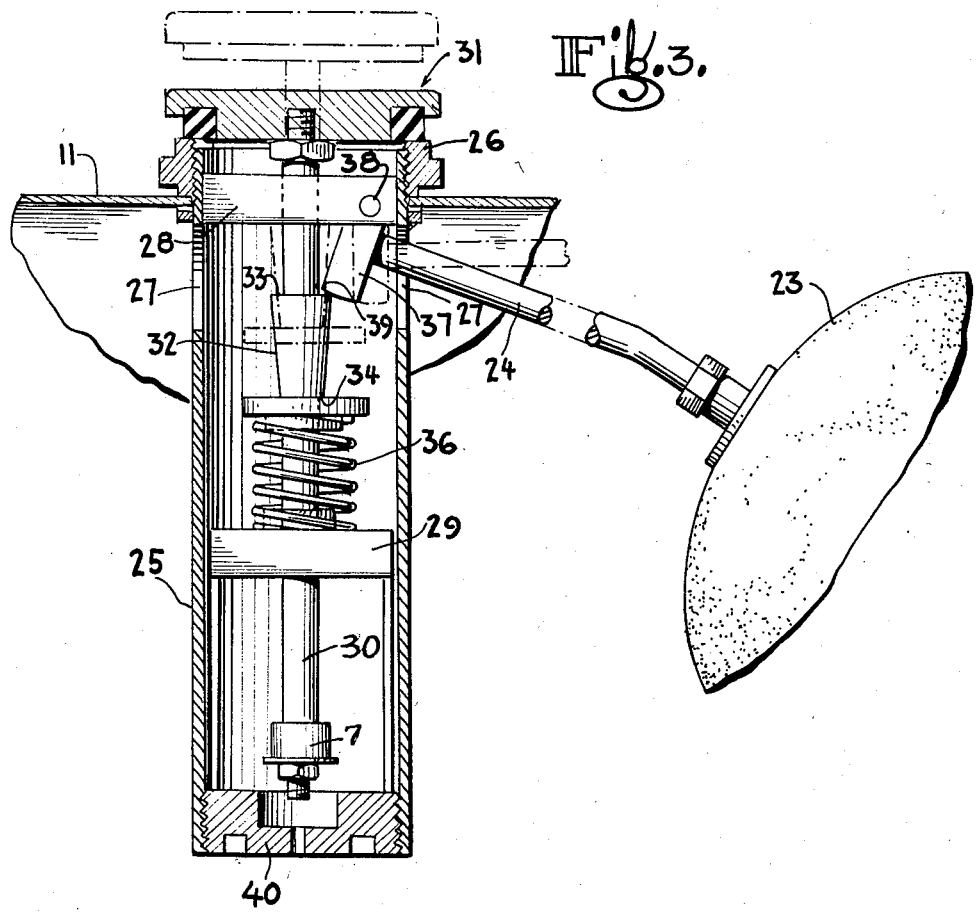
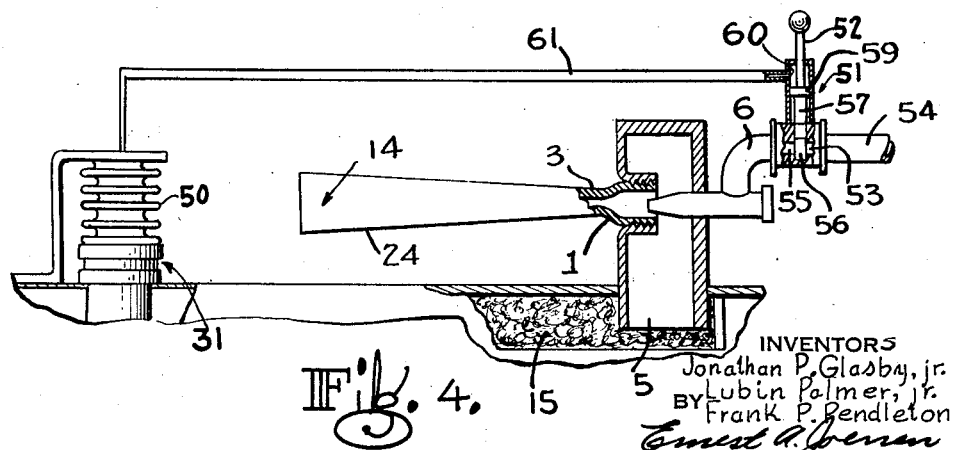
INVENTORS
Jonathan P. Glasby, jr.
BY Lubin Palmer, jr.
Frank P. Pendleton
ATTORNEY

United States Patent Office 2,889,846
Patented June 9, 1959

2,889,846

APPARATUS FOR MOVING FLUID MATERIAL BY SUCTION AND COLLECTING THE SAME

Jonathan P. Glasby, Jr., Verona, Lubin Palmer, Jr., Upper Montclair, and Frank P. Pendleton, Montclair, N.J., assignors to J. P. Glasby Manufacturing Co., Inc., Belleville, N.J., a corporation of New Jersey Application March 26, 1957, Serial No. 648,555

9 Claims. (Cl. 137—97)

The present invention relates to apparatus for moving fluid material by suction and collecting the same, and, more particularly, to such apparatus wherein the suction applying means is air operated and is rendered ineffective when a predetermined volume of material has been collected.

In apparatus for moving fluid materials, such as small particles, dust, objects and liquids by means of suction which is applied by a fan or pump, there is no problem in rendering the suction ineffective to stop the movement in material when the receptacle for collecting the materials has been filled because the suction ceases immediately upon opening the switch controlling the motor for the fan or pump. However, in apparatus such as disclosed in application for United States Letters Patent, Serial No. 648,556, filed March 26, 1957, wherein the suction is created by an air operated aspirator, the suction cannot be rendered ineffective immediately, because more time is required to shut off the valve which controls the air supplied to the aspirator than to operate a switch, whereby the material continues to be drawn into the receptacle at the risk of overfilling the same.

Accordingly, an object of the present invention is to provide an arrangement for air operated apparatus adapted to move fluid material by suction which can be rendered ineffective practically instantaneously.

Another object is to provide such an arrangement adapted for apparatus primarily intended to collect fluid material or to fill a receptacle with a predetermined volume thereof.

A further object is to provide such an arrangement which is simple, practical, reliable and economical.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a receptacle having an inlet for the fluid material and a port in communication with the atmosphere, a closure for the port, means for moving the closure in a direction to unclose the port, latch means for retaining the closure in a position to close the port, and a device responsive to the level of the material in the receptacle for rendering the latch means ineffective, whereby the port is unclosed to immediately render the suction in the receptacle ineffective and cause the collection of the material therein to cease.

In the drawings:

Fig. 1 is a fragmentary schematic longitudinal sectional view of apparatus for collecting fluid material in a receptacle.

Fig. 2 is a fragmentary schematic longitudinal sectional view of apparatus for filling receptacles to a predetermined level.

Fig. 3 is an enlarged fragmentary elevational view, partly in section, of an arrangement adapted for the apparatus shown in Figs. 1 and 2 to render the suction applying means ineffective immediately when the receptacle has been filled to a desired or predetermined level.

Fig. 4 is a schematic view partly in elevation and partly in section of a system for shutting off the air supplied to the suction creating means.

Referring to Fig. 1 of the drawings in detail, there is shown apparatus for moving fluid material by suction and collecting the same which comprises a receptacle such as a drum 10 having an open upper end, a cover 11 for the drum, an inlet 12 for the material, a normally closed port 13 adapted to be placed in communication with the atmosphere as described hereinafter, and means 14, for example such as disclosed in the aforementioned patent application, for applying suction to the receptacle adjacent the upper end thereof.

In the embodiment of the present invention illustrated in Fig. 1, the inlet 12 and the port 13 are provided on the cover 11, and the suction applying means 14 are mounted on the cover and include an opening in communication with the receptacle preferably through a filter unit 15. As shown herein, the inlet 12 is a tube adapted for connecting a length of hose thereto having a pick up device at its other end for drawing fluid material therein by means of the partial vacuum created in the receptacle. The suction applying means 14, as shown in Fig. 4, may be an ejector pump comprising a venturi tube having a converging end 1, a diverging end 2, and an intermediate throat 3; a casing 4 for mounting the tube having an inlet 5 extending into the filter unit 15; and a nozzle 6 extending into the casing 4 for directing compressed air into the venturi.

In Fig. 2, apparatus is shown which is primarily adapted for filling a drum 16 having an inlet tube 17 and an opening 18 on the cover thereof. This apparatus is supported on the cover of the drum and comprises a receptacle 19 having an inlet tube 20 at the bottom thereof extending into the drum through the opening 18, a foot or leg 21 standing on the cover of the drum for supporting the bottom of the receptacle 19. The tube 20, as shown, may have a flange 8 adjacent its lower end and a gasket 9 beneath the flange which is pressed against the drum structure defining the opening 18 to form an air tight seal about the tube 20 when the drum is vacuumized. The apparatus further comprises a normally closed port 22 adapted to be placed in communication with the atmosphere as described hereinafter, and means 14 for applying suction to the receptacle 19 adjacent the upper end thereof. A length of hose having a pick up device at its other end (not shown) is adapted to be connected to the inlet tube 17.

In both of the embodiments of the present invention illustrated herein (Figs. 1 and 2), it is desired to render the suction applying means ineffective by opening the port 13 or 22 to the atmosphere to thereby place the receptacle 10 or 19 under atmospheric pressure. Generally, this is accomplished by a float 23 suspended in the receptacle 10 or 19 at the upper end thereof by an operating rod or lever 24 associated with the port unclosing mechanism as about to be described.

In Fig. 3, the port unclosing mechanism is shown as it would be applied to the top of the receptacle 10 or 19. This mechanism comprises a tube 25 extending into the receptacle and suitably secured to the top thereof and having an open upper end formed with a valve seat 26 which provides the port 13 or 22 and having openings 27 in the side thereof just below the top of the receptacle, a cross bar or spider 28 secured within the tube 25 between the seat 26 and the openings 27, a second cross bar or spider 29 secured within the tube 25 above the lower end thereof, a stem or rod 30 slidably supported by the spiders 28 and 29 having a closure or valve member 31 secured to its upper end for normally engaging the seat 26 to close the port, a latch element 32 on the rod below the spider 28 having a shoulder 33 at its upper end and a shoulder 34 at its lower end, a flange 35 on the rod abutting the shoulder 34, a spring 36 compressed between the spider 29 and the flange for normally urging the rod upwardly to unseat the valve member and open the port, and a link 37 pivotally connected to the spider 28 at 38 having a latch element 39 at its free end for engaging the shoulder 33 to latch the rod in a position to cause the valve member to engage its seat and close the port and having the operating lever 24 with the float thereon secured adjacent its pivot. A resilient bumper 7 is secured to the lower end of the rod 30 which contacts the spider 29 when the rod is driven upwardly by the spring 36.

In addition to serving as a latch element, the shoulder 33 acts as a stop for the rod to limit the upward movement thereof under the influence of the spring by engaging the spider 28 at its underside when the latch is rendered ineffective. Also, the openings 27 provide for the flow of air from the port to the interior of the receptacle to destroy the vacuum therein, and one of these openings has the inner end of the lever 24 extending therethrough to enable connection thereof to the link 37. Preferably, the lower end of the tube is closed by a plug 40 provided with a drainage orifice. Since the openings 27 are just below the top of the receptacle and the float 23 is positioned well below these openings, the fluid material will not rise to a level whereby the same could enter the openings and contaminate the interior of the tube 25.

In either embodiment of the present invention, the float 23 is suspended at a desired level so that fluid material entering the receptacle 10 or 19 and rising to that level is effective to raise the float and cause the lever to turn the link 37 in a direction whereby the latch elements 33 and 39 disengage and the spring effects unclosing of the port practically instantaneously. This causes air to enter the receptacle and destroy the vacuum therein immediately, even while the suction applying means 14 are still in operation, whereby fluid material will cease to be drawn into the receptacle.

In both embodiments of the invention, the port unclosing mechanism just described serves to prevent overfilling of the receptacle. However, in the embodiment described in connection with Fig. 2, this mechanism further serves as a device for accurately measuring the material to be placed into a drum. This is accomplished by positioning the lower end of the inlet tube 20 at a position within the drum just below the level to which the drum is to be filled and thereby contain a measured volume of material, and adjusting the float at a level in the receptacle 19 to rise and render the latch ineffective when a measured volume of material has entered the receptacle.

Thus, as the drum is nearly filled to its desired level, fluid material is drawn upwardly by the inlet tube 20 and ries to a level within the receptacle 19 to operate the port unclosing mechanism. As this occurs, the vacuum in the receptacle is destroyed and the measured volume of fluid material, which has been drawn into the receptacle, returns by gravity flow through the tube 20 to the drum to thereby fill the same to its desired level.

The foregoing is accomplished in a precisely predictable manner by constructing the receptacle 19 so that the area of its bottom is much smaller than the cross-sectional area of the drum. Thus, a small increase in the fluid level of the drum causes a larger increase in the fluid level of the receptacle just prior to the stopping point, whereby rapid action of the port unclosing mechanism is made possible.

The mechanism just described can be adjusted by bending the lever 24 to suspend the float 23 at a desired level, and making the tube 20 and/or the leg 21 in two pieces, 41 and 42, threadedly secured to each other so that the level to which the lower end of the tube 20 extends can be varied.

The drum filling apparatus described in connection with Fig. 2 is particularly adapted for moving liquids from a source of supply into the drum. When air operated vacuum producing or suction applying means are utilized, as is contemplated herein, the apparatus can be used safely for moving volatile materials because no electrical devices are employed to operate the means 14 or the port unclosing mechanism.

A further modification of the present invention is shown schematically in Fig. 4, which enables the air supplied to the suction means 14 to be shut off in response to the operation of the float. For example, the movement of the valve member 31, as it is projected upwardly above its seat, can be utilized to compress a bellows 50 or the like mounted in the path thereof to create sufficient pressure to actuate a fluid actuated switch or valve 51, for example, a shuttle valve with a resetting stem 52, which shuts off the supply of air to the suction applying means and thereby shut off the same at the instant operation thereof is no longer required. Stoppage of the suction applying means will give an audible indication to the attendant that the receptacle has been filled, which indication can be confirmed by observing the position of the stem of the shuttle valve.

The valve 51 may comprise an inlet 53 connected to a compressed air supply conduit 54, an outlet 55 connected to the nozzle 6, an intermediate guideway 56 for a gate 57, a cylinder 58, a piston 59 in the cylinder to which the stem 52 and the gate 57 are secured, and an inlet 60 above the piston which is connected by a tube 61 to the bellows 50. The tube 61 has a relatively small bore so that the air confined therein can be compressed by a relatively large bellows to produce sufficient pressure to actuate the piston and cause the gate to shut off the supply of air to the nozzle.

From the foregoing description, it will be seen that the present invention provides improved apparatus for moving fluid material of all kinds and collecting solids and liquids so moved and stopping the apparatus in a rapid and reliable manner when a predetermined volume of the material has been collected. This is accomplished by mechanism which is simple, practical and economical in construction and can withstand the usage to which it is normally subjected without damage to or wear or contamination of the parts thereof.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. In apparatus for moving fluid material by suction, the combination of a tank having an inlet for the material adjacent the bottom thereof, a port in communication with the atmosphere and an opening both adjacent the top of the tank; a closure for said port, means for moving said closure in a direction to unclose said port; means for retaining said closure in a position to close said port, means connected to said opening for applying suction to said tank; a level responsive device for rendering said closure retaining means ineffective when the material in said tank rises to a predetermined level whereby said port is unclosed to render the suction in said tank ineffective; a drum having a cover formed with an inlet for the material and an outlet in communication with the inlet of said tank; and a tube extending from said tank inlet into said cover outlet to a level below the upper end of said drum, said level responsive means rendering said closure retaining means ineffective when the volume of the material drawn into said tank is less than the space in said drum above the lower end of said tube, whereby, upon rendering the suction in said tank ineffective, the material collected in said tank is adapted to flow back into said drum without overfilling said drum.

2. Apparatus according to claim 1, wherein said suction applying means is air operated and is mounted on said tank.

3. Apparatus according to claim 1, wherein said closure, said closure moving means, said closure retaining means and said level responsive device are mounted within said tank.

4. Apparatus according to claim 1, wherein said level responsive device and said tube are positioned to collect a predetermined volume of material in said drum.

5. Apparatus according to claim 4, wherein said level responsive means and said tube are adjustable.

6. A vacuum breaking device for apparatus adapted to move fluid material by suction comprising a sleeve adapted for securement within a receptacle and having a seat at the upper end thereof and aperture means in the side wall thereof below said seat and within the receptacle, a spider in said sleeve between said seat and said aperture means, a rod slidably mounted by said spider having a shoulder and a flange thereon, a support in said sleeve for slidably mounting the lower portion of said rod, a spring between said flange and said support for urging said rod upwardly, a closure member at the upper end of said rod for engaging said seat, a float, and means for pivotally mounting said float on said spider including an element for engaging said shoulder to retain said closure member on said seat.

7. A device according to claim 6, wherein said rod has a bumper at the lower end thereof for engaging said support when said rod is driven upwardly by said spring.

8. In apparatus for moving fluid material by suction, the combination of a receptacle having an inlet for the material and a port in communication with the atmosphere, suction applying means connected to said receptacle for vacuumizing the same, a closure for said port, means for moving said closure in a direction to unclose said port, means for retaining said closure in a position to close said port, a level responsive device for rendering said means ineffective when the material in said receptacle rises to a predetermined level, whereby said port is unclosed, said suction applying means being air operated and including a compressed air supply line, a normally open valve in said supply line, fluid operated means for closing said valve, and means operable by said closure for producing and supplying fluid under pressure to said valve closing means.

9. In apparatus for moving fluid material by suction, the combination of a receptacle having an inlet for the material and a port in communication with the atmosphere, suction applying means connected to said receptacle for vacuumizing the same, a closure for said port, means for moving said closure in a direction to unclose said port, means for retaining said closure in a position to close said port, a level responsive device for rendering said means ineffective when the material in said receptacle rises to a predetermined level, whereby said port is unclosed, said suction applying means being air operated and including a compressed air supply line, a normally open valve in said supply line, movable means for closing said valve, and means operable by said closure for operating said valve closing means.

References Cited in the file of this patent

UNITED STATES PATENTS

| | | |
|---|---|---|
| 566,625 | Savorgnan | Aug. 25, 1896 |
| 832,764 | Wood et al. | Oct. 9, 1906 |
| 1,049,180 | Walker | Dec. 31, 1912 |
| 2,549,181 | Durham | Apr. 17, 1951 |
| 2,606,543 | Rappl | Aug. 12, 1952 |
| 2,733,667 | Hill | Feb. 7, 1956 |

FOREIGN PATENTS

| | | |
|---|---|---|
| 504,786 | France | of 1920 |
| 547,521 | France | of 1922 |